May 17, 1966  YOSHIHISA MAITANI  3,251,287
DRIVE FOR ROTARY SHUTTER USED IN CAMERA
Filed Feb. 17, 1964  2 Sheets-Sheet 1
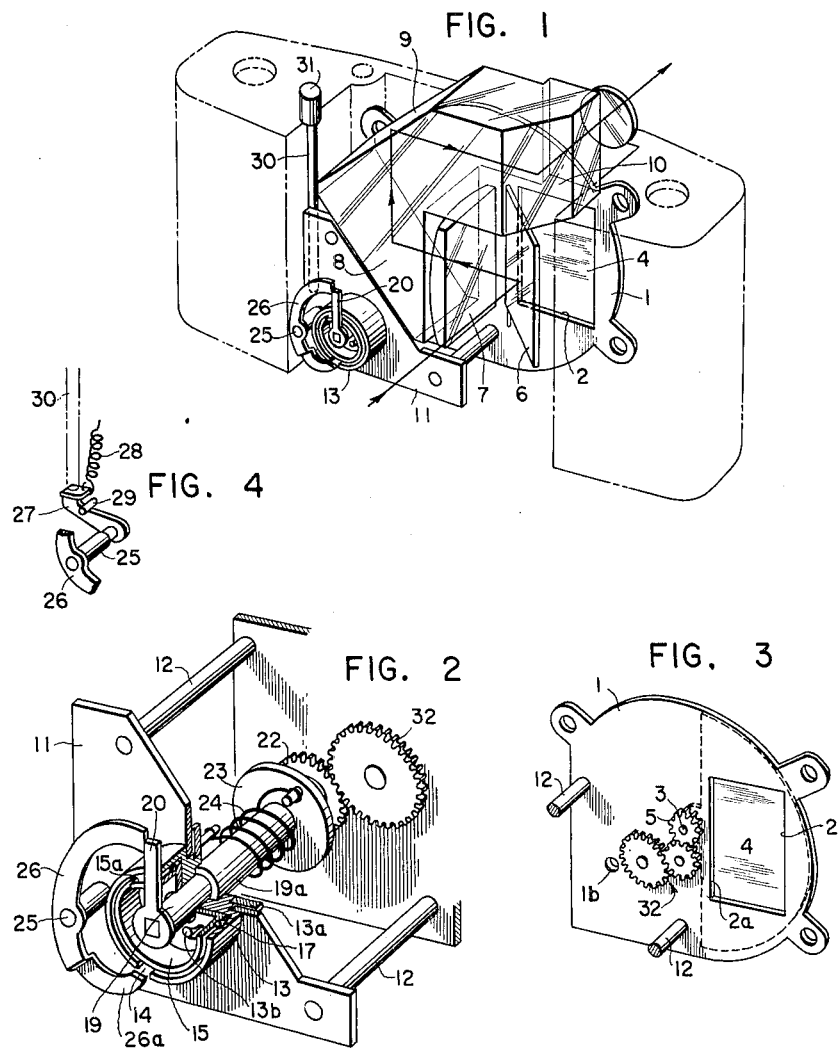

United States Patent Office 3,251,287
Patented May 17, 1966

3,251,287
DRIVE FOR ROTARY SHUTTER USED IN CAMERA
Yoshihisa Maitani, Tokyo, Japan, assignor to Olympus Kogaku Kogyo Kabushiki-Kaisha, Tokyo, Japan
Filed Feb. 17, 1964, Ser. No. 345,396
Claims priority, application Japan, Feb. 19, 1963, 38/8,339
1 Claim. (Cl. 95—61)

This invention relates to a device for driving a rotary shutter used in a photographic camera and is particulary suitable for driving a rotary shutter of the type including one or two shutter sectors disposed close to a film window and capable of rotating to traverse the film window while effecting an exposure.

According to the teachings of the invention a device for driving a rotary shutter of the type such as described in the preceding paragraph comprises a driving shaft loosely extending through both an energizing element and a braking element at their centers of rotation, driving spring means operatively coupled to the driving shaft, and a releasing element operative during taking up of a photographic film to permit the driving spring means to be tensioned through rotational movement of the energizing element. Then a shutter button is operated to cause the releasing element to prevent rotational movement of the energizing element and to free the driving shaft to permit the driving shaft to rotate by the action of the tensioned driving spring means. This rotational movement of the driving shaft is transmitted to the shutter sector to perform an exposure operation. The driving spring means further serves to drive the braking element to effect a braking operation. Then release of the shutter button returns the movable components to their original positions.

The invention will become more readily apparent from the following detailed description taken in conjunction with the accompanying drawings in which:

FIG. 1 shows, in perspective, the manner in which a device embodying the teachings of the invention is incorporated into a single lens reflex camera including a focal plane type rotary shutter;

FIG. 2 is a fragmentary perspective view of the device illustrated in FIG. 1 with a part broken away for the purpose of clarity;

FIG. 3 is a perspective view of a focal plane type rotary shutter suitable for use with the invention;

FIG. 4 is a fragmentary perspective view of a mechanism for releasing the shutter;

Figure 5A:
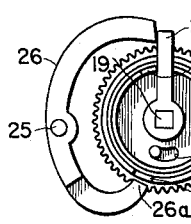
Figure 5B:
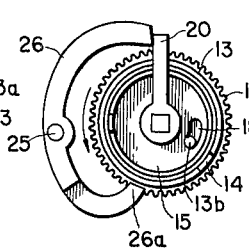
Figure 5C:
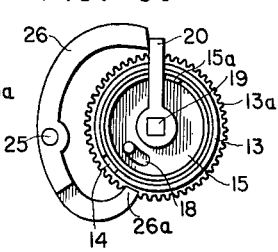
Figure 5D:
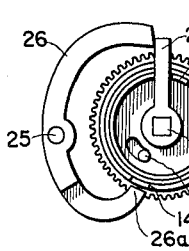
Figure 5E:
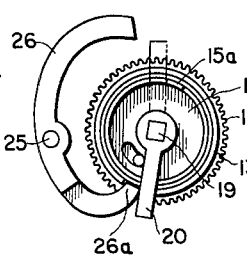
Figure 5F:
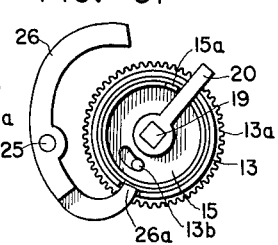
Figure 5G:
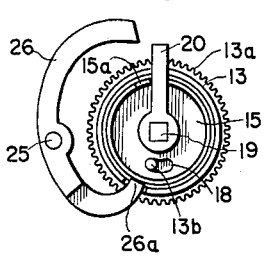
Figure 6:
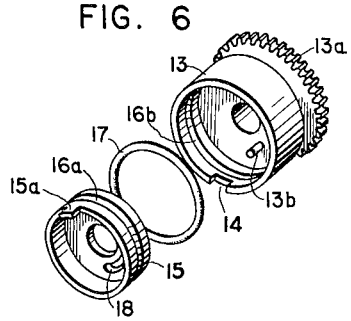

FIG. 5 a through g are plan views showing movable elements of the present device in their various positions during tensioning and operating processes; and FIG. 6 is an exploded perspective view of energizing and braking elements used in the present device.

While the invention is applicable to various types of shutter devices for use in a photographic camera the same is particularly suitable for use with shutter devices of the type including one or two shutter sectors disposed closely to a film window in a camera and adapted to be rotated to traverse the film window while effecting an exposure and therefore will be described and illustrated in connection with this type of shutter device.

Referring now to FIG. 1 of the drawings, there is illustrated a single lens reflex camera embodying the teachings of the invention. The arrangement illustrated comprises a camera housing designated in dotted-and-dashed line and suitable for use in successively recording on a 35 mm. wide perforated photographic film pictures corresponding in size to one standard frame presently used in the field of motion pictures. The housing is provided on the front side with a recess so that it has a U-shaped horizontal section. A base plate 1 as shown in FIG. 3 is rigidly secured to the bottom of the recess as by rivets and is provided with a film window 2 disposed off center thereof, in this case, in the right hand portion. The film window 2 is longitudinally elongated and may preferably correspond in size to one standard frame presently used in the field of motion pictures. Adjacent the middle of the inner edge 2a of the film window 2 a rotatable shaft 3 extends loosely through the base plate 1 and on the respective ends are rigidly secured a shutter sector 4 and a gear 5 at their centers of rotation.

In the front of the film window 2 a reflecting mirror 6 is disposed for rocking movement about its axis of rotation parallel to and adjacent the inner edge 2a of the film window and is normally at an angle of 45 degrees to an optical axis of a photographic objective (not shown). The mirror 6 serves as a reflecting mirror for use in the conventional type of reflex cameras and is adapted to reflect an image for an object focused by the photographic objective on a focusing screen 7 positioned symmetrically with respect to the mirror with the plane of the film window. On that side of the focusing screen 7 remote from the reflecting mirror 6 a finder prism or an optical system constituting finder means is disposed having reflecting planes. More specifically, assuming that the reflecting plane of the movable mirror 6 is called a first reflecting plane, the prism includes a second reflecting plane 8 tilted at an angle of 45 degrees on that side of the focusing screen 7 remote from the mirror 6, a third reflecting plane 9 orthogonal to the second reflecting plane 8 and a fourth reflecting plane 10 tilted at angle of 45 degrees to the third reflecting plane 9.

The image formed on the focusing screen 7 is successively reflected from these reflecting planes to be directed above the upper side of the housing and toward the rear of the same. The image thus directed can be observed through an eyepiece (not shown) forming the finder means.

As in the conventional type of reflex cameras the reflecting mirror 6 may serve as a movable mirror adapted to rock to its position parallel to the focusing screen 7 immediately before a frame of a photographic film is exposed to light. Alternatively, the reflecting mirror 6 may be stationary and be a semi-transparent type.

As shown in FIG. 1, a space in the form of a right triangular prism is provided between the second reflecting plane 8 and the wall of the recess on the camera housing. The device of the invention is advantageously disposed which will be subsequently described with reference to FIG. 2.

As shown in FIG. 2, a mounting plate 11 is rigidly secured through supporting rods 12 to the base plate 1 in parallel relationship to the front of the plate on the lefthand and lower portion as viewed in FIG. 2. Rotatably carried on the mounting plate 11 is a cylindrical sleeve coaxially mounted on a bottomed cylindrical energizing element 13 on the outside of the bottom to form a unitary structure therewith. The shell is provided at that end projecting from the mounting plate 11 toward the base plate 11 with a toothed circumferential flange or gear 13a adapted to be operatively coupled to a mechanism for taking up a length of photographic film (not shown). The cylindrical element 13 is open at that end remote from the gear 13a and is provided at that end with a notch 14. Coaxially inserted into the cylindrical element 13 is a bottomed cylindrical member 15 smaller in diameter than the same and the inner wall surface of the outer cylindrical element 13 and the outer wall surface of the inner cylindrical member 15 are provided with a pair of opposed circumferential grooves 16 a and b respectively which, in turn, engage a friction annulus 17 made of any suitable soft synthetic resin.

The inner cylindrical member which may be hereinafter called a braking element is provided on the bottom with an arcuate slot 18 concentric to the axis of the cylindrical members 13 and 15 with the slot loosely engaging an eccentric pin 13b mounted on the internal bottom surface of the energizing element 13. The braking element 15 includes a projection 15a extending axially from the open end.

A driving shaft 19 extends rotatably through the bottom plates of the energizing and braking elements 13 and 15 at their centers and has its rear end portion loosely journalled in an opening 1b (see FIG. 3) formed in the base plate 1 while having on its front end an arm 20 which projects radially. The projection 15a on braking element 15 is within a region of a path along which the radial arm 20 is rotatable. The driving shaft 19 includes an enlarged portion 19a on which a gear 22 and a flange 23 are rigidly secured in coaxial relationship and flange 23 has a driving spring 24 of helical configuration anchored at one end to flange 23 and the other end to gear 13a with the spring loosely wound around shaft 19.

Further, a side shaft 25 substantially parallel to the driving shaft 19 extends loosely through the mounting plate 11 and has fixed on its front end a shutter releasing element 26 having its main body of curved shape positioned in a plane in which the radial arm 20 is rotatable. The rear end of the side shaft 25 projects beyond the back face of the mounting plate 11 and has a radial arm 27 (see FIG. 4) tending to rotate in the clockwise direction as viewed in FIG. 4 under the action of a spring 28 coupled to the same until the arm abuts against a stopper 29. The lower end of a shutter releasing rod 30 connected to a shutter button 31 (see FIG. 1) rests on the free end of the radial arm 27. One end portion 26a of the curved release element is stepped toward the mounting plate 11 after which it is turned inwardly with its radius of curvature gradually decreasing in order to permit the extremity of the lower stepped portion 26a to jump into the notch 14 disposed at the open end of the energizing element 13 (see FIG. 5).

It is to be noted that the gear 22 on the enlarged portion 19a of the driving shaft 19 is operatively coupled to the gear 5 through suitable intermediate transmission gear 32.

The arrangement thus far described is operated as follows: FIG. 2 illustrates the device in its state immediately after one frame of the photographic film has been exposed to light whereupon the various movable components of the device as viewed from the front side are put in their relative positions illustrated in FIG. 5a. Under these circumstances, when a new frame of the film is transported an interlocking mechanism (not shown) is operated to cause the gear 13a coaxially integral with the energizing element 13 to rotate through a predetermined angle in the counterclockwise direction as viewed in FIG. 5. During this rotational movement of the gear 13a the radial arm 20 engages one end of the curved release element 26 whereby the driving spring 24 is tensioned while the driving shaft 19 remains immovable.

In this tensioning process, the various movable components are varied in their relative positions as illustrated in FIGS. 5 a through d. More specifically, the projection 15a on the braking element 15 is rotated in the counterclockwise direction about the axis of the driving shaft 19 and abuts against the radial arm 20 on the opposite side (on the righthand side thereof as viewed in FIG. 5d) to be stopped upon the completion of the tensioning operation. Also in the process of energizing the driving spring 24, rotation of the energizing element 13 is accompanied by rotation of the braking element 15 disposed within the same due to frictional engagement of the friction annulus 17 (see FIG. 6) with both elements. However, after the braking element 15 has been stopped (see FIG. 5c) the outer element 13 alone advances against the frictional resistance provided by the friction annulus 17 until the pin 13b strikes that end of the slot 18 corresponding to the advance side (see FIG. 5d).

Then the shutter button 31 can be operated to downwardly thrust the releasing rod 30. This permits an arm 27 as shown in FIG. 4 to rotate the curved release element 26 about the axis of the side shaft 25 in the counterclockwise direction to thereby cause the inwardly directed end of the lower stepped portion 26a to jump in the notch 14 on the outer cylindrical element 13 resulting in the outer element being prevented from further rotating. At the same time, the radial arm 20 is disengaged from the release elment 26 and hence the driving shaft 19 integral with the arm 20 along with the gear 22 is rotated in the counterclockwise direction by the action of resilience of the driving spring 24 tending to loosen the same. In this way, the driving shaft 29 and the gear 22 can be continued to be rotated until the radial arm 20 reaches its position illustrated in FIG. 5f where the arm strikes against the projection 15a on the braking element 15. During this rotational movement of the radial arm 20 the shutter shaft 3 is rotated through the intermediate transmission gearing 32 and the gear 5 to rotate the shutter section 4 resulting in the completion of an exposure.

During an interval of time when the device is changing from its state illustrated in FIG. 5f to its state illustrated in FIG. 5g, the resilience of the motive spring 24 tending to loosen the same overcomes the frictional resistance provided by the friction annulus 17 to forcedly rotate the braking element 15 through the radial arm 20 and the projection 15a contacting the arm until the eccentric pin 13b abuts against the opposite end of the slot 18 (see FIG. 5f). In this connection it is to be noted that the slot 18 should have such a length that when the eccentric pin 13b abuts against the opposite end of the slot 18 as just described the inner and outer elements 15 and 13 and the radial arm 20 are in their positions corresponding respectively to those shown in FIG. 5a.

The shutter button 31 can now be released to rotate the curved release element 26 in the clockwise direction by the action of the spring 28 (see FIG. 4) until the end of the element abuts against the radial arm 20. Thus all the movable components have returned to their original positions illustrated in FIG. 2 or FIG. 5a.

In the embodiment of the invention described, the shaft for the shutter section is required only to effect one complete rotation as the energy stored in the driving spring 24 is dissipated. Therefore, it will be readily understood that the proper selection of the intermediate transmission gear 32 is not always required to make a gear ratio between the gears 5 and 22 equal to 1:1. While the invention has been described in terms of the bottomed cylindrical configuration of the energizing and braking elements 13 and 15 disposed coaxially with each other with the friction annulus 17 interposed therebetween, both elements may have their main bodies in the form of two circular disks disposed in parallel relationship and including a member of friction resistance interposed therebetween with satisfactory results.

The invention has various advantages. For example, a drive for a shutter can be compactly assembled about a single shaft which drive includes means for automatically stopping taking-up of a photographic film and preventing double exposure. Thus it is particularly suitable for use with small-sized photographic cameras. Especially in small-sized single lens reflex cameras including an optical system for finder means within its housing, the device of the invention can be conveniently disposed in a narrow space remaining unused within the housing. Further all movable components forming the present device are of a undirectional rotation type except for the release element and are not required to be rotatable in the opposite direction with the result that mechanisms used are greatly simplified. In addition, the high speed rotatable components are arranged to be braked by frictional resistance at the end of their rotational movement after an exposure operation has been performed. This alleviates an impact acting on each of these components immediately before its rotational movement at high speed is terminated leading to the possibility of designing easily high speed shutters.

The device of the invention as previously described may be controlled in exposure time by disposing an appropriate protrusion on the energizing element of outer cylindrical shape or a portion integral therewith. Then the protrusion is arranged to engage a portion of a toothed section providing a first gear of a braking gear train in the well known manner, whereby any desired shutter speed can be obtained.

What I claim is:

A device for driving a rotary shutter used in a photographic camera, comprising, in combination, a first shaft including a radial arm member projecting therefrom, a braking element having a projection positioned in a region of a path along which said radial arm member is movable, an energizing element in frictional engagement with said braking element and having a notch disposed on the periphery thereof opening in the same direction as the axis of said first shaft, said first shaft loosely extending through both said braking element and said energizing element at their centers of rotation and said elements being rotatable on said first shaft, driving spring means loosely wound around said first shaft and having one end anchored on said first shaft and the other end anchored on said energizing elment, an eccentric pin mounted on said energizing element extending parallel to said first shaft, said braking elment having an arcuate slot therein concentric with said first shaft, said eccentric pin being loosely inserted in said arcuate slot, a second shaft disposed parallel to said first shaft, a shutter releasing element rigidly secured on said second shaft, said releasing element having one end normally preventing rotational movement of said radial arm member and the other end capable of engaging said notch simultaneously with a releasing operation, a gear member coaxially integral with said energizing element and operatively coupled to a mechanism for taking up a length of photographic film, a third shaft including said rotary shutter rigidly secured thereto, and means for transmitting rotational movement of said first shaft to said third shaft.

No references cited.

JOHN M. HORAN, *Primary Examiner.*